United States Patent Office 3,310,669
Patented Mar. 21, 1967

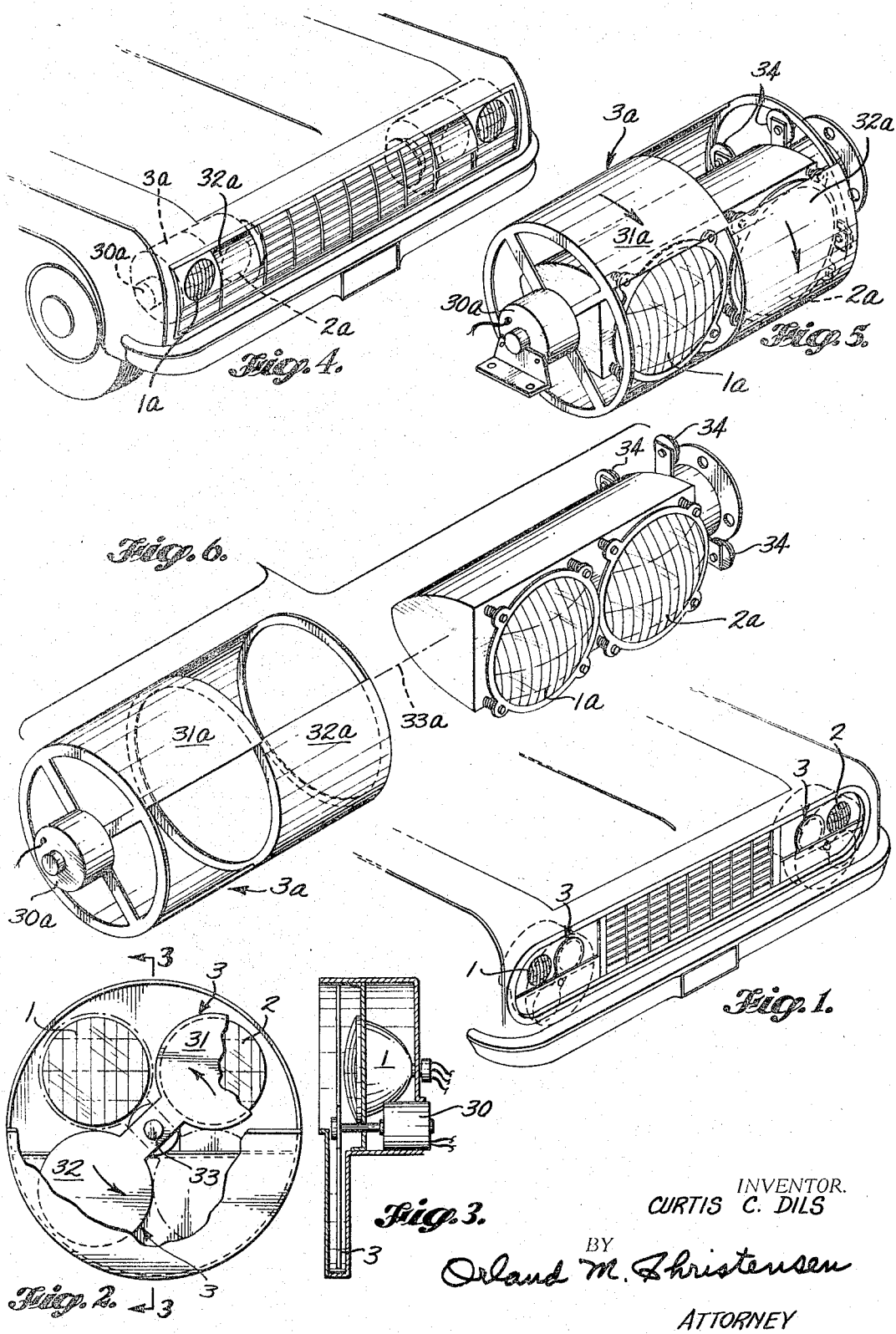

3,310,669
HEADLIGHT SYSTEM FOR AUTOMOBILES
Curtis C. Dils, Rte. 6, Box 331F,
Olympia, Wash. 98501
Filed Oct. 29, 1964, Ser. No. 407,389
4 Claims. (Cl. 240—7.1)

This invention concerns a headlight system for automobiles, arranged to lessen or even eliminate the glare from them, such as tends to blind an oncoming driver, yet without lessening the ability of the driver whose vehicle is thus equipped to see clearly at all times.

According to this invention an automobile is provided, at each side, with two light sources directed forwardly, and with an obturator that moves continuously to cut off light from one source while permitting emission of light from the second source, and then immediately to cut off light from the second source while permitting emission of light from the first source, and so on alternatively, continuously and rapidly. By reason of the persistence of vision the driver of an automobile thus equipped continues to see perfectly objects illuminated now by the first light source and again by the second, yet because of the interruption of the light from the respective sources there is no continuous glare from a single source in the eyes of an oncoming driver, and his vision is not interfered with.

It is an object of the present invention to provide such a system, in a simple embodiment. More especially, it is an object to provide a system of the character described, wherein the obturator and the light sources are relatively arranged in a simple manner, and sufficiently compactly for installation in automobiles without appreciable change in or modification thereof.

The invention is illustrated in the accompanying drawings in representative forms, although it will be understood that changes may be made in the form, character, and relationship of parts, as will appear more fully hereinafter.

FIGURE 1 is an isometric view of the headlights of an automobile, equipped with the system of this invention in a simple form.

FIGURE 2 is a front elevational view, partly broken away, of a headlight according to this invention, and FIGURE 3 is a section along the line 3—3 of FIGURE 2.

FIGURE 4 is a view similar to FIGURE 1, showing a modified form of the invention.

FIGURE 5 is an isometric view of the headlights at one side, in the latter form.

FIGURE 6 is an exploded isometric view of the headlight system of the latter form, showing separately the headlights and the obturator.

It is my observation that it is not the mere presence of an oncoming light beam that blinds an approaching driver, but rather it is the persistence of that light beam. If the light beam were extinguished briefly the approaching driver would not be blinded, but its extinguishment, though momentary, would permit the oncoming vehicle to traverse an appreciable distance, at normal highway speeds, before the light beam resumes and illuminates the roadway. This might be dangerous, for an obstacle too distant to be observed clearly at the instant the light was extinguished, might be too close to be readily avoided when the light beam resumes, and the obstacle is again illuminated, with the vehicle running at, say, sixty miles per hour. If the light were to be extinguished for only two seconds the automobile would have advanced some one hundred and seventy-five feet, and before the obstacle were again fully illuminated and the danger realized, it might be too late to stop the automobile. The period of extinguishment might be lessened, yet it takes time for the eye to overcome its reaction to a light, though the same be extinguished, and there is a point where a minimum period of extinguishment is too short to eliminate glare.

But, if there were two lights, and only one of these was to be extinguished, or obturated, leaving the other emitting light ahead, and this situation were reversed at frequent but sufficiently long intervals, and continuously, always one of the two lights would illuminate the roadway while the other was obturated, and vice versa. There would be no cessation of illumination of the roadway, yet because there were two spaced apart sources of light, alternately shining ahead, there would be no persistence of any single light source, and hence no blinding effect would be produced, or at least, would be greatly lessened. This, then, is the operating theory of my invention, and the same can be embodied in various forms, and applied to various vehicles and for various purposes.

I have referred above to two light sources and to an obturator cooperating with both sources to obturate light emission from one source while permitting emission from the second source, and then by its movement permitting emission from the first source while obturating the second, and so on rapidly and continuously alternating; the invention is shown in two such arrangements, yet it is clear that other arrangements are equally feasible. There might be, for example, several light sources, successively obturated and then permitting emission.

As shown, two spaced apart but near by light sources 1 and 3 are shown. The obturator, a two-bladed rotor 2 with the two blades 31, 32 diametrically disposed, is so located that it rotates unidirectionally ahead of the light sources, and by locating the sources 1 and 2 at approximately 90°, one from the other, about the rotative axis 33 at any one time in its rotation the blade 31 will obturate say the source 1, as it is about to do in FIGURE 2, while blade 32 is clear of source 2, yet by rotation of the blades through 90° the blade 31 is clear of source 1, and blade 32 will obturate source 2. Alternation from one source to the other occurs regularly and rapidly. A motor 30 or other suitable means serves to rotate the rotor 3. If the automobile were equipped with only a single headlight at each side, there might be separate obturators for the respective headlights, properly timed and coordinated, but such an arrangement would be more complex mechanically and less satisfactory for this and other reasons.

In the form shown in FIGURES 4, 5 and 6 the obturator is shown as a hollow cylinder 3a, rotative about a horizontal axis 33a, with two light sources 1a and 2a enclosed within the cylinder 3a, and disposed side by side horizontally. Obturators 31a and 32a are arranged to blank out one source while clearing the other, and then vice versa, as the cylinder is rotated at an appropriate speed by its motor 30a. Supports 34 may be used to hold steady the open end of the cylinder. The headlights might be disposed vertically, in which case the rotative axis of the obturator would be vertical.

It will be noted that the light sources preferred are the usual sealed-beam headlamps, and that their dual arrangement may be such as any that is commonly used. The obturator need take no appreciable space in the fender that might be required for wheel clearance or any other purpose.

Clearly, there might be more than two light sources, and the rotor might have more than two obturators, yet the same result could be obtained. The arrangements described are simple and effective.

Not only is the headlight system described useful in avoiding blinding of an oncoming driver while effectively illuminating the roadway at all times; it has been found highly useful as a fog light. In fog the steady headlight beam reflects back from fog particles ahead, and this acts as a screen to prevent penetration of the light beam ahead, and to blind the driver by reflected light. By rapidly alternating the light from the respective sources there is no build-up of reflective particles, and the alternating light beams tend better to penetrate the fog, and less to blind the driver whose car is thus equipped. For this reason the headlight system of this invention is useful as landing lights for aircraft, as well as headlights for automobiles. Indeed, the system of this invention may be employed on other vehicles, and will be useful under various circumstances. While in the claims it will be referred to in connection with its use on automobiles, this is only by way of example, and such other installations and uses are intended to be included, without restriction.

Moreover, while the obturator in both forms shown is rotative unidirectionally, it might oscillate or reciprocate. The unidirectional rotative movement is the simplest mechanically, and so is preferred.

It might be supposed that a like result might be obtained by cutting off the current supply to one such headlight while supplying current to the other, and then the reverse, in alternate succession. This will not serve the purpose nearly as well, for the reason that there is rather an extended period after current cut-off before a lamp is actually extinguished, yet its light emission in that interval is decreasingly poor for vision, but the persistence of vision still observes its blinding tendency. Abrupt and fairly rapid cessation of light emission, with like commencement of emission from the second source, such as can best be obtained by the use of obturators, is preferred.

I claim as my invention:

1. An automotive lighting system for reducing headlight glare in the eyes of oncoming drivers comprising the combination of
    a motor vehicle,
    two light sources mounted adjacent each other on one side of the front of said motor vehicle,
    obturator means for each light source, and
    means moving said obturator means in front of each light source to cut off light rays successively first from one source and then the other,
    whereby light rays are being emitted from one source when the other is cut off, and vice versa to prevent the presence of a single continuous light source producing an uninterrupted glare.

2. The combination according to claim 1 wherein said obturator means comprises
    a hollow cylinder portion generally enclosing each light source and mounted for rotation about each said light source,
    each hollow cylinder portion comprising an open area to expose the enclosed light source during a period of rotation.

3. The combination according to claim 1 wherein said obturator means comprises
    a plurality of blade members mounted for rotation in front of said light sources.

4. The combination according to claim 3 wherein said obturator means comprises
    two blade members diametrically disposed.

References Cited by the Examiner
UNITED STATES PATENTS

| | | | |
|---|---|---|---|
| 1,282,430 | 10/1918 | Jones | 340—125 |
| 1,435,520 | 11/1922 | Hammond | 352—63 |
| 1,548,450 | 8/1925 | Fitch | 340—130 |
| 2,273,512 | 2/1942 | Caldwell et al. | 352—63 X |
| 2,460,864 | 2/1949 | Whiteley | 352—62 X |

NORTON ANSHER, *Primary Examiner.*

C. R. RHODES, *Assistant Examiner.*